(12) United States Patent
Huang et al.

(10) Patent No.: US 8,544,493 B2
(45) Date of Patent: Oct. 1, 2013

(54) WATER HAMMER PROOF AND SILENT CHECK VALVE

(75) Inventors: Hongbin Huang, Guangdong (CN); Jiyue Yang, Guangdong (CN)

(73) Assignee: Guangdong Liansu Technology Industrial Co., Ltd., Foshan (CN)

( * ) Notice: Subject to any disclaimer, the term of this patent is extended or adjusted under 35 U.S.C. 154(b) by 93 days.

(21) Appl. No.: 13/320,417

(22) PCT Filed: Jan. 15, 2010

(86) PCT No.: PCT/CN2010/070220
§ 371 (c)(1),
(2), (4) Date: Nov. 14, 2001

(87) PCT Pub. No.: WO2011/079537
PCT Pub. Date: Jul. 7, 2011

(65) Prior Publication Data
US 2012/0060943 A1    Mar. 15, 2012

(30) Foreign Application Priority Data

Dec. 31, 2009    (CN) .......................... 2009 1 0214483

(51) Int. Cl.
*F16K 1/12*    (2006.01)
*F16K 21/04*    (2006.01)
*F16K 31/12*    (2006.01)

(52) U.S. Cl.
USPC .............. 137/220; 137/511; 137/514; 251/48

(58) Field of Classification Search
USPC .............. 137/220, 511, 514, 514.7, 499, 494, 137/497, 504; 251/48
See application file for complete search history.

(56) References Cited

U.S. PATENT DOCUMENTS

| 2,693,931 | A | * | 11/1954 | Emerick et al. ................. 251/50 |
| 3,194,255 | A | * | 7/1965 | Flaton et al. ................... 137/220 |
| 4,373,544 | A | * | 2/1983 | Goodman et al. ............ 137/220 |
| 5,921,276 | A | * | 7/1999 | Lam et al. ................... 137/514.7 |
| 6,132,191 | A | * | 10/2000 | Hugenroth et al. .......... 418/55.1 |
| 2004/0046135 | A1 | | 3/2004 | Wieder |
| 2005/0155645 | A1 | | 7/2005 | Freudendahl |

FOREIGN PATENT DOCUMENTS

| CN | 2153686 Y | 1/1994 |
| CN | 2580243 Y | 10/2003 |
| CN | 2611707 Y | 4/2004 |
| CN | 2851767 Y | 12/2006 |

OTHER PUBLICATIONS

International Search Report for PCT/CN2010/070220, dated Oct. 14, 2010.

* cited by examiner

*Primary Examiner* — John Rivell
*Assistant Examiner* — Daphne M Barry
(74) *Attorney, Agent, or Firm* — Pearne & Gordon LLP

(57) ABSTRACT

A water-hammer proof and silent check valve comprises a shell (1), a spring (9), a flow guide body (10) and a cowl (11). The flow guide body (10) is provided with flow blocking boards (4, 6) which project from the outer surface of the flow guide body (10) and are capable of rotating around installation shafts (3, 7). A plurality of flow blocking boards are arranged in the flow passage in the axial direction of the valve, so that most part of pressure energy and kinetic energy are undertaken by the flow blocking boards by grading when liquid flows back to the valve, thus ensuring that the water hammer with large energy is divided into multiple water hammers with relatively smaller energy so as to greatly reduce the inner stress of valve bearing parts.

10 Claims, 4 Drawing Sheets

WATER HAMMER PROOF AND SILENT CHECK VALVE

The present application is the national phase of International Application No. PCT/CN2010/070220, titled "WATER HAMMER PROOF AND SILENT CHECK VALVE", filed on Jan. 15, 2010, which claims the benefit of priority to Chinese patent application No. 200910214483.4 titled "WATER HAMMER PROOF AND SILENT CHECK VALVE", filed on Dec. 31, 2009. The entire disclosure thereof is incorporated herein by reference.

FIELD OF THE INVENTION

The invention belongs to the filed of check valve manufacture, particularly relates to a water-hammer proof and silent check valve.

BACKGROUND OF THE INVENTION

Check valve is a basic element of fluid control engineering and is applied very widely, playing a role of protecting other fluid machines and pipelines by stopping back flow of fluid. In the traditional check valve, a valve plate closes very fast, and the check valve generally mounted on the pipeline connected with the outlet end of a pump and closes to the outlet end of the pump for preventing back flow of fluid in the pipeline from damaging the pump, thereby protecting the pump. Currently, swing check valve and lifting check valve are commonly used in pipeline systems. Water hammer occurs in the pipeline system when a downstream valve is closed suddenly, and the check valve automatically closes due to flow break in the pipeline, so water hammer waves directly act on the check valve, and will damage the valve in severe case. The failure of a check valve is usually connected to water hammer accidents. Fast opening and closing of the check valve will cause water hammer which will damage the check valve, resulting in chain reaction in a loop and damage of more fluid parts (including other check valves) and thus making accidents more serious. The vicious circle will lead to serious consequence whichever link it starts.

The traditional check valves, no matter swing check valve, lifting check valve or inclined-disc type check valve, have a common characteristic that a valve plate is always in acceleration process during opening and closing such that moving parts of the check valve move too fast before stop, that is the direct cause of water hammer and valve clack impact of the check valve. In order to solve the problems of water hammer and valve clack impact of the check valve, three check valves which have dampers are developed: mechanical damped check valve, hydraulic damped check valve and hybrid damped check valve. The mechanical damped check valve has the advantage that the damping characteristic of the damper is easy to set through mechanical structures and the disadvantage that with the increase of flow velocity and flow quantity of fluid in a pipeline, the relative damping mechanism becomes huge and complex, and with the widening of variation domain of flow velocity and flow quantity in the pipeline, the opening-closing characteristics of the check valve at low flow velocity and quantity are deteriorated seriously (the check valve can not open and close normally in the condition of low flow velocity and quantity). The hydraulic damped check valve employs a special structure, such that the moving parts of the valve must do work to some part of fluid during opening and closing so as to reduce the kinetic energy of the moving parts, achieving the object of prolonging closure time and relieving valve clack impact. The scheme has the advantage that the check valve has simple structure and high operation reliability and disadvantages that the movement of fluid in the valve body is complex, the hydraulic damping characteristics are difficult to meet requirements through parametric design, design cost is high, and because damping of the hydraulic damper is increased with the increase of flow velocity and flow quantity in the pipeline, the hydraulic damped check valve has certain defects for high-flowrate pipelines having lower limit request on pipeline size. The hybrid damped check valve is a design combining the mechanical damped check valve and the hydraulic damped check valve, which optimizes the opening-closing characteristics of the check valve through complementary advantages. According to patens at home and abroad, this scheme have failed to make a breakthrough. A common shortcoming of damped check valves is that slow closing of the valve plate is liable to cause back flow of a part of water into a water pump, resulting in reverse rotation of the water pump.

In addition to the above check valves, there are silent check valve, direct impact check valve, water-hammer proof spherical check valve, etc. The silent check has low noise of closing because of short moving distance of the valve plate but can not avoid water hammer; actually, the direct impact check valve belongs to hydraulic damped check valves; and the spherical check valve has favorable water-hammer proof effect, but has high manufacture cost due to excessive complex structure and more sealing surfaces.

SUMMARY OF THE INVENTION

The object of the invention is to provide a water-hammer proof and silent check valve having simple structure and capable of effectively reducing concentrated impact of water hammer energy to the valve in the axial direction to overcome the defects of the prior art.

In order to realize the object, the invention employs the following technical scheme:

A water-hammer proof and silent check valve comprises a shell, a spring, a flow guide body and a cowl, wherein the flow guide body is provided with flow blocking boards which project from the outer surface of the flow guide body and are capable of rotating around flow blocking board installation shafts.

In the invention, the flow blocking boards are mounted on the flow guide body via the flow blocking board installation shafts and project from the outer surface of the flow guide body, such that backflow liquid impacts the flow blocking boards firstly when the check valve is closed, and the flow blocking boards continuously buffer the impact of the backflow liquid to reduce, even counteract the impact force of the liquid.

In the above technical scheme, said flow blocking board installation shafts are disposed inside the flow guide body, and said flow blocking boards project from the outer surface of the flow guide body via flow blocking board bearing holes arranged on the flow guide body.

Furthermore, the side of said each flow blocking board towards the water inlet of the check valve has a smooth arc transition, and the side towards the water outlet of the check valve is of a flat board structure. With such structure, when the check valve is opened, normal water flow passes through the sides having the smooth arc transition surfaces of the flow blocking boards when flowing in the fluid space between the shell and the flow guide body in the axial direction, so that the flow blocking boards have almost no effect on the normal water flow and can not be impacted by the normal water flow; and when the check valve is closed, backflow liquid firstly impacts the sides of the flat board structures of the flow blocking boards, then the flow blocking boards effectively butter the impact of the water flow, and because the flow blocking boards can rotate around the installation shafts, relative stress surfaces can rotate between the normal water flow and the backflow water flow to face the impact of the water flow.

Said each flow blocking board is formed by connecting two flat boards, an angle is formed between the connected flat boards, the outer convex surface of the flow blocking board is towards the water inlet of the check valve and are provided with smooth arc transitions, and the inner concave surfaces are towards the water outlet of the check valve. With the structure of two flat boards, two flat board surfaces are impacted sequentially by water flow because of the rotation of the flow blocking boards when backflow water impacts the flow blocking boards, and in this process of conversion of the two flat boards, it can play a part of buffering, thereby having remarkable effect of flow blocking and avoiding damage to the flow blocking boards caused by large impact force of the backflow water.

The angle formed by the flat boards is an acute angle of 20-45 degrees. Furthermore, said each flow blocking board comprises an installation body, an installation shaft hole, a rear wing plate, a front wing plate, a rear intermediate plate and a front intermediate plate, wherein the rear wing plate is parallel to the rear intermediate plate, the front intermediate plate is perpendicular to the rear intermediate plate, the intersection angle between the front wing plate and the rear wing plate is an acute angle, the rear wing plate comprises a rear upstream face and a rear downstream face, the front wing plate comprises a front upstream face and a front downstream face, the front downstream face and the rear downstream face form a downstream face, and the downstream face is connected with the rear wing plate and the front wing plate via an arc section.

The main body of the flow blocking board installation body is of a cylindrical body formed by two parallel planes which are perpendicular to the rear intermediate plate, the installation body is provided with a shaft hole parallel to the rear intermediate plate, and the front edge surface of the installation body is of a cylindrical surface.

Said flow guide body of the invention comprises a core body which is a streamline revolving body taking the axial line of the check valve as an axle center, the tail part of the core body is provided with an installation ring supported by several support plates, the cylindrical surface of the installation ring is mounted on the shell, the core body is further provided with a shaft hole which is a blind hole, the axial line of the shaft hole coincides with the axial line of the core body, the wall surface of the core body is provided with flow blocking board bearing holes, the central lines of the flow blocking board bearing holes are positioned on the plane perpendicular to the axial line of the core body, the front end surface of the core body is a plane perpendicular to the axial line.

The core body is internally provided with flow blocking board installation bodies, and the flow blocking boards are mounted on the flow blocking board installation bodies via the flow blocking board bearing holes.

As a detailed scheme, the invention comprises a shell, a sealing ring, a cowl, a flow guide body, flow blocking boards, flow blocking board installation shafts, a central shaft, a spring and flow blocking board installation bodies, wherein an installation ring for the flow guide body is mounted at the water outlet of the shell, the central shaft is mounted in the shaft hole of the flow guide body, the flow blocking board installation bodies are mounted inside the flow guide body via the central shaft, the flow blocking boards penetrate through the flow blocking board bearing holes and mounted on the flow blocking board installation bodies via the flow blocking board installation shafts, the cowl is mounted on the central shaft via a shaft sleeve and corresponds to the front end surface of the flow guide body, the spring is arranged between the shaft sleeve and the central shaft, and the sealing surface of the cowl corresponds to the sealing ring disposed at the water inlet of the shell.

The invention provides a design of a direct-flow type water-hammer proof and silent check valve capable of eliminating water hammer by grading. In the valve, several groups of flow blocking boards are disposed in a flow passage of the valve in the axial direction and undertake most pressure energy and kinetic energy by grading when liquid flows back to the valve, namely that a water hammer with huge energy is divided into water hammers with relative small energy, thereby greatly reducing the inner stress of valve bearing parts. Compared with a slow-closing type check valve and a damped check valve, the invention has the following advantages: first, the water hammer is divided; second, the valve plate closes rapidly to prevent a part of water from flowing back into a pump; and third, the invention has simple structure and low manufacture cost.

DETAILED DESCRIPTION OF THE PREFERRED EMBODIMENT

Figure 1:
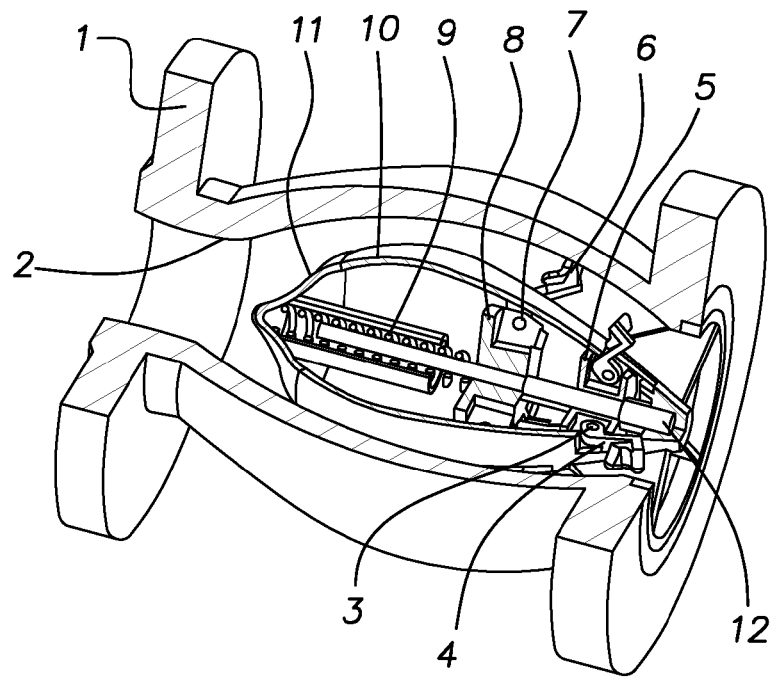
FIG. 1 is a structural diagram of the invention.

The invention is further described by combining the following drawings. As shown in FIG. 1, the invention comprises a shell 1, a sealing ring 2, a cowl 11, a flow guide body 10, flow blocking boards 4 and 6, flow blocking board shafts 3 and 7, a central shaft 12, a closing spring 9 and flow blocking board installation bodies 5 and 8.

Figure 2:
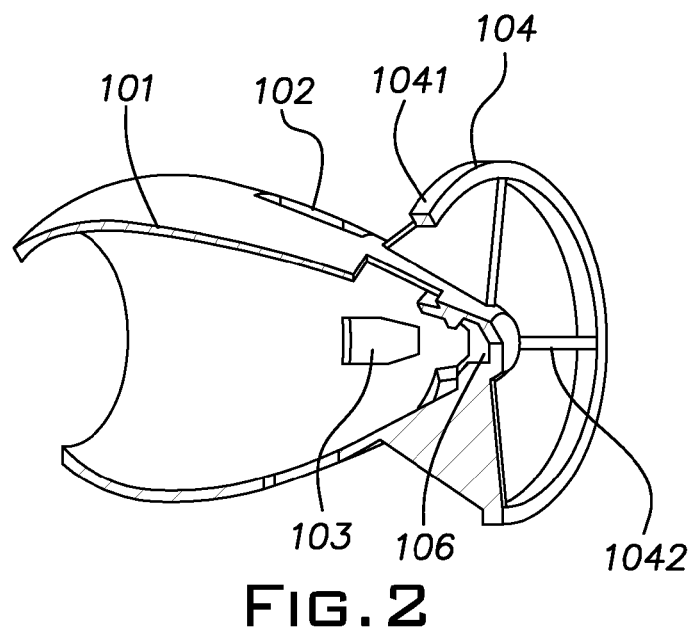
FIG. 2 is a structural diagram of the flow guide body.
Figure 3:
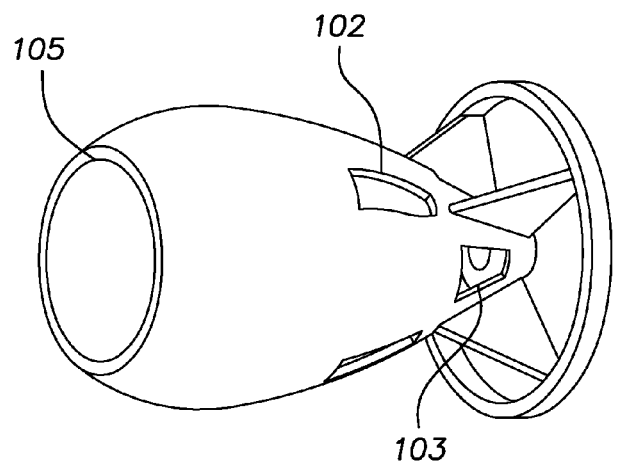
FIG. 3 is another structure diagram of the flow guide body.

The structure of the flow guide body 10 as shown in FIG. 2 and FIG. 3 comprises a core body 101, a support ring 104, flow blocking board bearing holes 102 and 103, and a shaft hole 106. The flow guide body is of a streamline revolving body in the axial direction of the valve in general characteristics. Said core body 101 is a streamline revolving body taking the axial line of the valve as an axle center, the tail end of the core body is provided with an installation ring 104 supported by several support plates 1042, and the cylindrical surface 1041 of the installation ring 104 is used for being mounted on the shell 1. The core body 101 is further provided with a shaft hole 106 which is blind hole with the axial line coinciding with the axial line of the core body. The wall surface of the core body 101 is provided with two rows of flow blocking board bearing holes 102 and 103, and each row has four holes with the same size. The central line of the holes of each row are positioned on a plane perpendicular to the axial line of the core body, and the flow blocking board 4 or 6 is connected with the installation body 5 or 8 via the two rows of holes. The front end surface 105 of the core body is a plane perpendicular to the axial line.

Figures 4A, 4B, 4C, 4D:
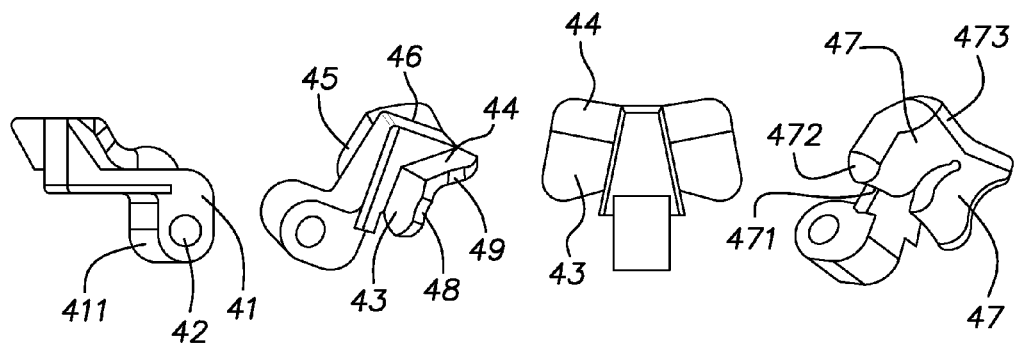
FIG. 4 is a structure diagram of the flow blocking board.

FIG. 4 shows the structure of the flow blocking board 4, in which FIG. 4(a) shows the structure of an installation body 41, FIG. 4(b) shows the spatial structure of the flow blocking board 4 facing backflow water, FIG. 4(c) shows the front structure of the flow blocking board 4 facing backflow water, and FIG. 4(d) is the spatial structure of the flow blocking board 4 facing normal water flow. The flow blocking board 4 comprises the installation body 41, an installation shaft hole 42, a rear wing plate 48, a front wing plate 49, a rear intermediate plate 45 and a front intermediate plate 46. Said rear wing plate 48 is parallel to the rear intermediate plate 45, said front intermediate plate 46 is perpendicular to the rear intermediate plate 45, and the intersection angle between the front wing plate 49 and the rear wing plate 48 is an acute angle of 20-45 degrees preferably. The main body of the installation body 41 is of a cylindrical body formed by two parallel planes which are perpendicular to the rear intermediate plate 45. Said installation body 41 is provided with a shaft hole 42 parallel to the rear intermediate plate. The front edge surface 411 of the installation body 41 is of a cylindrical surface. Said rear wing plate 48 is formed by a rear upstream face 43 and a downstream face 471. Said front wing plate 49 is formed by a front upstream face 44 and a front downstream face 473. A downstream face 47 is formed by the front downstream face 473 and the rear downstream face 471. The downstream face 47 is connected with the rear wing plate 48 and the front wing plate 49 via an arc 472 which is intersected with the edges of the two wing plates instead of is tangent with them. The flow blocking board 6 has the same structure with the flow blocking board 4.

Figures 5A, 5B, 5C:
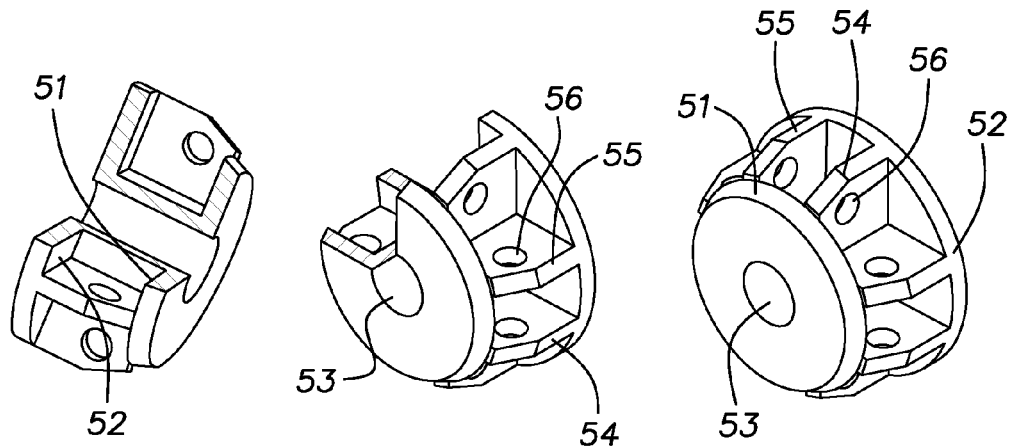
FIG. 5 is a structure diagram of the flow blocking board installation body.

FIG. 5 shows the structure of the flow blocking installation body 5 which is a combination body of a cylinder and a cone in general structure, and the combination body is provided with a shaft hole 53 on the center along the axial line. Parallel planes 51 and 52 of the combination body are perpendicular to the axial line of the valve. The surfaces of the cylinder and the cone of the combination body are provided with several groups of flat boards parallel to the axial line, and each group has two parallel flat boards 54 and 55 which are connected with planes 51 and 52 at two ends, respectively. The flat boards 54 and 55 of each group are provided with holes 56 perpendicular to the flat boards 54 and 55. The flow blocking board installation body 8 has the same structure with the flow blocking board installation body 5.

Figure 6:
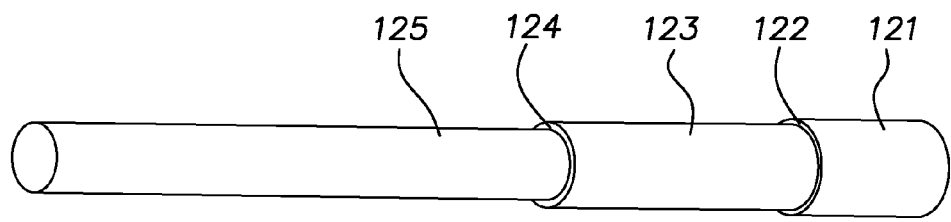
FIG. 6 is a structural diagram of the central shaft.

FIG. 6 shows the structure of the central shaft 12 which comprises an installation section 121, force bearing end surfaces 122 and 124 and installation sections 123 and 125 for the flow blocking board installation bodies.

Figure 7:
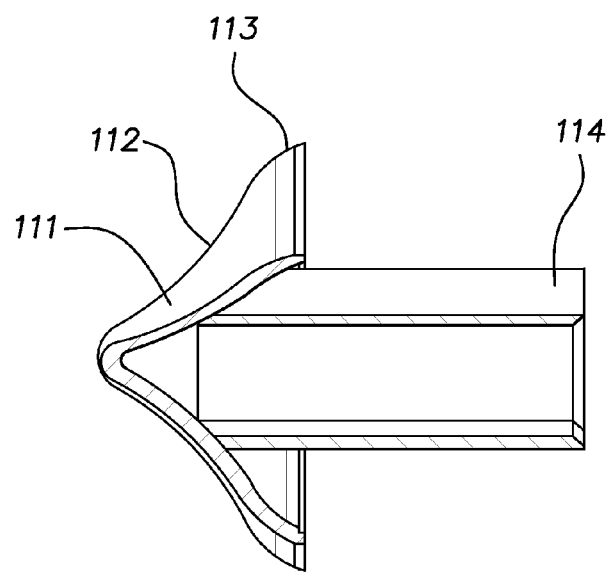
FIG. 7 is a structural diagram of the cowl.

FIG. 7 shows the structure of the cowl 11 which comprises a cowl body 111, a sealing surface 113, a front end surface 115 fitted with the front edge 105 of the core body 101, and a shaft sleeve 114 fitted with the spring 9. Said cowl 11 is of a revolving body with a generatrix of a smooth spline curve, such that fluid can smoothly enter the valve body. Said sealing surface 113 is a part of the cowl body 111. Said end surface 115 has an external diameter equal to that of the front end 105 of the core body 101, and when the end surface 115 attaches the front end 105 tightly, the generatrix 112 coincides with the generatrix of the core body 101 at the tangent line of the attaching position. The inner wall surface of the shaft sleeve 114 is of a cylindrical surface, and the shaft sleeve can slide along the outer cylindrical surface of the central shaft 12.

The invention has the following working process:

When a pump valve is opened, the pressure force of fluid acts on the cowl 11, presses the spring 9 and pushes away the cowl 11, such that the end surface 115 of the cowl 11 coincides with the front end surface 105 of the core body 101, and the fluid enters the valve along the valve shaft. In this case, the flow blocking boards 4 and 6 rotate around the flow blocking board installation shafts 3 and 7 and tightly attaches on the outer surface of the flow guide body 10, and the downstream face 47 has smooth arc transition on the flow blocking boards 4 and 6 to ensure an unobstructed flow passage. When a downstream valve is closed or the front pump valve is closed suddenly, the pressed spring 9 springs back because of water break to press the cowl 11 to the sealing ring of the shell 1 before the pressure waves of the water flow return. The returned pressure waves firstly impact the front upstream face 44 of the front wing plate 49 of the flow blocking board 4 that is closed to the downstream, to lift the flow blocking board 4, and then the pressure waves impact the rear upstream face 43 of the rear wing plate 48 of the flow blocking board 4 to cause the valve body to bear a part of water hammer energy. The pressure waves bypassing the flow blocking board 4 then impact the second grade of the flow blocking board 6 and complete the same working process as the flow blocking board 4, such that the valve body further consumes a part of water hammer energy. If necessary, more grades of flow blocking boards can be arranged. Alternatively, all flow blocking boards can be disposed along the spiral line of the central shaft 12, such that energy consumed by the valve each time is much smaller compared with above arrangement in rows. The water hammer energy is divided, so the valve is changed from bearing a water hammer with huge energy at a certain moment to bearing several much smaller water hammers at different moments, thereby greatly reducing the centralized impact of water hammer energy to the valve.

The invention claimed is:

1. A water-hammer proof and silent check valve comprising a shell (1), a spring (9), a flow guide body (10) and a cowl (11), characterized in that the flow guide body (10) is provided with flow blocking boards (4, 6) which project from the outer surface of the flow guide body (10) and are capable of rotating around flow blocking board installation shafts (3, 7).

2. The water-hammer proof and silent check valve as claimed in claim 1, wherein the flow blocking board installation shafts (3, 7) are disposed inside of the flow guide body (10), and the flow blocking boards (4, 6) project from the outer surface of the flow guide body (10) via flow blocking board bearing holes (102, 103) arranged on the flow guide body (10).

3. The water-hammer proof and silent check valve as claimed in claim 1, wherein the side of said each flow blocking board (4, 6) towards the water inlet of the check valve has a smooth arc transition, and the side towards the water outlet of the check valve is of a flat board structure.

4. The water-hammer proof and silent check valve as claimed in claim 3, wherein said each flow blocking board (4, 6) is formed by connecting two flat boards, an angle is formed between the connected flat boards, and its outer convex surfaces are towards the water inlet of the check valve and are provided with smooth arc transitions, and its inner concave surfaces are towards the water outlet of the check valve.

5. The water-hammer proof and silent check valve according as claimed in claim 4, wherein the angle formed by the flat boards is an acute angle of 20-45 degrees.

6. The water-hammer proof and silent check valve as claimed in claim 5, wherein the flow blocking board (4) comprises an installation body (41), an installation shaft hole (42), a rear wing plate (48), a front wing plate (49), a rear intermediate plate (45) and a front intermediate plate (46), wherein the rear wing plate (48) is parallel to the rear intermediate plate (45), the front intermediate plate (46) is perpendicular to the rear intermediate plate (45), the intersection angle between the front wing plate (49) and the rear wing plate (48) is an acute angle, the rear wing plate (48) comprises a rear upstream face (43) and a rear downstream face (471), the front wing plate (49) comprises a front upstream face (44) and a front downstream face (473), the front downstream face (473) and the rear downstream face (471) form a downstream face (47), and the downstream face (47) is connected with the rear wing plate (48) and the front wing plate (49) via an arc section (472).

7. The water-hammer proof and silent check valve as claimed in claim 6, wherein the main body of the flow blocking board installation body (41) is of a cylindrical body formed by two parallel planes which are perpendicular to the rear intermediate plate (45), the installation body (41) is provided with a shaft hole (42) parallel to the rear intermediate plate (45), and the front edge surface (411) of the installation body (41) is of a cylindrical surface.

8. The water-hammer proof and silent check valve as claimed in claim 1, wherein the flow guide body (10) comprises a core body (101) which is a streamline revolving body taking the axial line of the check valve as an axle center, the tail part of the core body is provided with an installation ring (104) supported by several support plates (1042), the cylindrical surface (1041) of the installation ring (104) is mounted on the shell (1), the core body (101) is further provided with a shaft hole (106) which is a blind hole, the axial line of the shaft hole coincides with the axial line of the core body (101), the wall surface of the core body (101) is provided with flow blocking board bearing holes (102, 103), the central lines of the flow blocking board bearing holes (102, 103) are positioned on the plane perpendicular to the axial line of the core body (101), the front end surface (105) of the core body (101) is a plane perpendicular to the axial line.

9. The water-hammer proof and silent check valve as claimed in claim 8, wherein the core body (101) is internally provided with flow blocking board installation bodies (5, 8), and the flow blocking boards (4, 6) are mounted on the flow blocking board installation bodies (5, 8) via the flow blocking board bearing holes (102, 103).

10. The water-hammer proof and silent check valve as claimed in claim 1, wherein the check valve comprises a shell (1), a sealing ring (2), a cowl (11), a flow guide body (10), flow blocking boards (4, 6), flow blocking board installation shafts (3, 7), a central shaft (12), a spring (9) and flow blocking board installation bodies (5, 8), wherein an installation ring (104) for the flow guide body (10) is mounted at the water outlet of the shell (1), the central shaft (12) is mounted in the shaft hole (106) of the flow guide body (10), the flow blocking board installation bodies (5, 8) are mounted inside the flow guide body (10) via the central shaft (12), the flow blocking boards (4, 6) penetrate through the flow blocking board bearing holes (102, 103) and mounted on the flow blocking board installation bodies (5, 8) via the flow blocking board installation shafts (3, 7), the cowl (11) is mounted on the central shaft (12) via a shaft sleeve (114) and corresponds to the front end surface (105) of the flow guide body (10), the spring (9) is arranged between the shaft sleeve (114) and the central shaft (12), and the sealing surface (113) of the cowl (11) corresponds to the sealing ring (2) disposed at the water inlet of the shell (1).

* * * * *

UNITED STATES PATENT AND TRADEMARK OFFICE
CERTIFICATE OF CORRECTION

| | | |
|---|---|---|
| PATENT NO. | : 8,544,493 B2 | Page 1 of 1 |
| APPLICATION NO. | : 13/320417 | |
| DATED | : October 1, 2013 | |
| INVENTOR(S) | : Hongbin Huang et al. | |

It is certified that error appears in the above-identified patent and that said Letters Patent is hereby corrected as shown below:

Title Page:

Item 86 should read --November 14, 2011--

Signed and Sealed this
Seventh Day of January, 2014

Margaret A. Focarino
*Commissioner for Patents of the United States Patent and Trademark Office*